United States Patent
Oh

(10) Patent No.: US 9,347,589 B1
(45) Date of Patent: May 24, 2016

(54) STRUT CLAMP

(71) Applicant: Kwang Oh, La Crescenta, CA (US)

(72) Inventor: Kwang Oh, La Crescenta, CA (US)

(73) Assignees: Lawrence S. Cohen, Los Angeles, CA (US); Kwang Oh, Los Angeles, CA (US)

( * ) Notice: Subject to any disclaimer, the term of this patent is extended or adjusted under 35 U.S.C. 154(b) by 0 days.

(21) Appl. No.: 14/659,417

(22) Filed: Mar. 16, 2015

Related U.S. Application Data

(60) Continuation of application No. 13/692,953, filed on Dec. 3, 2012, now Pat. No. 8,979,038, and a division of application No. 12/256,407, filed on Oct. 22, 2008, now Pat. No. 8,322,661.

(51) Int. Cl.
| | |
|---|---|
| *F16L 3/24* | (2006.01) |
| *F16L 3/04* | (2006.01) |
| *F16L 3/00* | (2006.01) |
| *F16L 3/10* | (2006.01) |
| *F16L 3/12* | (2006.01) |
| *F16L 3/14* | (2006.01) |
| *F16L 3/22* | (2006.01) |

(52) U.S. Cl.
CPC ... *F16L 3/24* (2013.01); *F16L 3/00* (2013.01); *F16L 3/04* (2013.01); *F16L 3/10* (2013.01); *F16L 3/12* (2013.01); *F16L 3/14* (2013.01); *F16L 3/22* (2013.01)

(58) Field of Classification Search
CPC .................. F16L 3/00; F16L 3/10; F16L 3/24; F16L 3/12; F16L 3/14; F16L 3/22
USPC ........... 248/58, 62, 63, 65, 67.5, 68.1, 70, 72, 248/73, 74.1, 74.3, 74.4, 74.5, 223.41, 248/224.61, 225.21, 230.1, 230.6, 230.7, 248/230.8, 230.9, 316.1, 340; 403/385, 403/386, 387, 400, 373, 397
See application file for complete search history.

(56) References Cited

U.S. PATENT DOCUMENTS

| | | | | | |
|---|---|---|---|---|---|
| 2,375,513 | A | * | 5/1945 | Bach | 248/59 |
| 2,511,035 | A | * | 6/1950 | Barton | 403/385 |
| 2,676,680 | A | * | 4/1954 | Kindorf | 403/22 |
| 2,746,701 | A | * | 5/1956 | Carpenter et al. | 248/73 |
| 2,767,951 | A | * | 10/1956 | Cousino | 248/245 |
| 2,863,625 | A | * | 12/1958 | Attwood | 248/62 |
| 2,880,949 | A | * | 4/1959 | Fuss | 248/70 |

(Continued)

FOREIGN PATENT DOCUMENTS

| | | | | |
|---|---|---|---|---|
| EP | 2587105 | A | * | 5/2013 |
| JP | 07127765 | A | * | 5/1995 |

(Continued)

*Primary Examiner* — Terrell McKinnon
*Assistant Examiner* — Eret McNichols
(74) *Attorney, Agent, or Firm* — Lawrence S. Cohen

(57) ABSTRACT

A method for applying a clamp for a construction strut that allows a pipe to be clamped to the construction strut in which the clamp has a fastener that is not exposed above the clamp curvature and in which the fastener head is easily accessible. Also the clamp has a retaining tab and a neck portion such that it can be installed by straight-in insertion at the top of a construction strut. Also, the method has an embodiment in that the clamp can be installed either on the open side of the construction strut or on the closed side using slots in the closed side by straight-in passing the retaining tab past the inturned flanges on the top of the construction strut and by a rotation at the bottom of the construction strut.

19 Claims, 14 Drawing Sheets

(56) References Cited

U.S. PATENT DOCUMENTS

| | | | | | |
|---|---|---|---|---|---|
| 3,053,355 | A | * | 9/1962 | Attwood | 403/22 |
| 3,145,962 | A | * | 8/1964 | Kindorf | 248/68.1 |
| 3,185,419 | A | * | 5/1965 | Kindorf | 248/73 |
| 3,226,069 | A | * | 12/1965 | Clarke | 248/73 |
| 3,370,815 | A | * | 2/1968 | Opperthauser | 248/74.2 |
| 3,417,951 | A | * | 12/1968 | Rebentisch, Jr. | 248/62 |
| 3,463,428 | A | * | 8/1969 | Kindorf et al. | 248/72 |
| 3,486,726 | A | * | 12/1969 | Kindorf et al. | 248/72 |
| 3,522,921 | A | * | 8/1970 | Lytle | 248/62 |
| 3,527,432 | A | * | 9/1970 | Lytle | 248/62 |
| 3,532,311 | A | * | 10/1970 | Havener | 248/62 |
| 3,547,385 | A | * | 12/1970 | Kindorf et al. | 248/62 |
| 3,650,499 | A | * | 3/1972 | Biggane | 248/62 |
| 3,888,440 | A | * | 6/1975 | Rebentisch | 248/73 |
| 3,888,441 | A | * | 6/1975 | Rebentisch | 248/73 |
| 3,894,707 | A | * | 7/1975 | Heard | 248/230.9 |
| 4,044,428 | A | * | 8/1977 | Kowalski | 24/16 R |
| 4,157,800 | A | * | 6/1979 | Senter et al. | 248/72 |
| 4,185,802 | A | * | 1/1980 | Myles et al. | 248/74.4 |
| 4,211,381 | A | * | 7/1980 | Heard | 248/230.8 |
| 4,369,945 | A | * | 1/1983 | Mantoan et al. | 248/73 |
| 4,408,922 | A | * | 10/1983 | D'Alessio | 403/12 |
| 4,408,928 | A | * | 10/1983 | Steinke | 403/320 |
| 4,417,711 | A | * | 11/1983 | Madej | 248/74.4 |
| 4,429,440 | A | * | 2/1984 | Laughlin et al. | 24/486 |
| 4,439,899 | A | * | 4/1984 | ReuBoiu et al. | 24/458 |
| 4,516,296 | A | * | 5/1985 | Sherman | 24/279 |
| 4,708,554 | A | * | 11/1987 | Howard | 411/84 |
| 4,770,378 | A | * | 9/1988 | Onishi et al. | 248/68.1 |
| 4,961,553 | A | * | 10/1990 | Todd | 248/62 |
| 5,022,614 | A | * | 6/1991 | Rinderer | 248/62 |
| 5,141,186 | A | * | 8/1992 | Cusic | 248/73 |
| 5,165,628 | A | * | 11/1992 | Todd et al. | 248/62 |
| 5,217,191 | A | * | 6/1993 | Smith | 248/55 |
| 5,590,504 | A | * | 1/1997 | Heard et al. | 52/836 |
| 5,704,571 | A | * | 1/1998 | Vargo | 248/58 |
| 5,769,365 | A | * | 6/1998 | Onishi et al. | 248/49 |
| 5,799,907 | A | * | 9/1998 | Andronica | 248/62 |
| 5,893,538 | A | * | 4/1999 | Onishi et al. | 248/65 |
| 5,967,467 | A | * | 10/1999 | Onishi et al. | 248/49 |
| 5,984,243 | A | * | 11/1999 | Pfaller et al. | 248/74.1 |
| 6,364,256 | B1 | * | 4/2002 | Neider et al. | 248/55 |
| 6,402,096 | B1 | * | 6/2002 | Ismert et al. | 248/68.1 |
| 6,446,915 | B1 | * | 9/2002 | Ismert | 248/68.1 |
| 6,494,415 | B1 | * | 12/2002 | Roth | 248/74.1 |
| 6,572,057 | B1 | * | 6/2003 | Roth | 248/58 |
| 6,588,711 | B2 | * | 7/2003 | Onishi | 248/49 |
| 6,708,937 | B2 | * | 3/2004 | Thurman | 248/201 |
| 7,073,755 | B2 | * | 7/2006 | Michaud et al. | 248/72 |
| 7,179,010 | B2 | * | 2/2007 | Weger et al. | 403/289 |
| 7,484,697 | B1 | * | 2/2009 | Nelson | 248/62 |
| 7,520,475 | B2 | * | 4/2009 | Opperthauser | 248/71 |
| 7,523,897 | B2 | * | 4/2009 | Boltz et al. | 248/71 |
| 7,591,442 | B2 | * | 9/2009 | Dinh et al. | 248/73 |
| 7,594,787 | B2 | * | 9/2009 | Womack et al. | 410/104 |
| 7,735,270 | B2 | * | 6/2010 | Olle et al. | 52/167.9 |
| 7,814,710 | B2 | * | 10/2010 | Foglia | 52/92.2 |
| 7,922,130 | B2 | * | 4/2011 | Hawkins | 248/74.2 |
| 7,992,829 | B1 | * | 8/2011 | Baker et al. | 248/73 |
| 8,091,839 | B2 | * | 1/2012 | Whipple et al. | 248/67.7 |
| 8,322,661 | B2 | * | 12/2012 | Oh | 248/62 |
| 2001/0004099 | A1 | * | 6/2001 | Onishi | 248/49 |
| 2005/0072883 | A1 | * | 4/2005 | Michaud et al. | 248/74.1 |
| 2006/0027715 | A1 | * | 2/2006 | Dinh et al. | 248/65 |
| 2006/0284027 | A1 | * | 12/2006 | Smith et al. | 248/65 |
| 2009/0272856 | A1 | * | 11/2009 | Azuma et al. | 248/73 |
| 2010/0260573 | A1 | * | 10/2010 | Gardner et al. | 411/81 |
| 2012/0012715 | A1 | * | 1/2012 | Andersen et al. | 248/74.1 |
| 2012/0025034 | A1 | * | 2/2012 | Turner | 248/65 |

FOREIGN PATENT DOCUMENTS

| | | | | |
|---|---|---|---|---|
| JP | 07133885 | A | * | 5/1995 |
| JP | 07224972 | A | * | 8/1995 |
| JP | 07317716 | A | * | 12/1995 |
| JP | 07317966 | A | * | 12/1995 |
| JP | 10030752 | A | * | 2/1998 |
| JP | 10210636 | A | * | 8/1998 |
| JP | 2003222269 | A | * | 8/2003 |
| JP | 2005140137 | A | * | 6/2005 |
| JP | 2008281176 | A | * | 11/2008 |

* cited by examiner

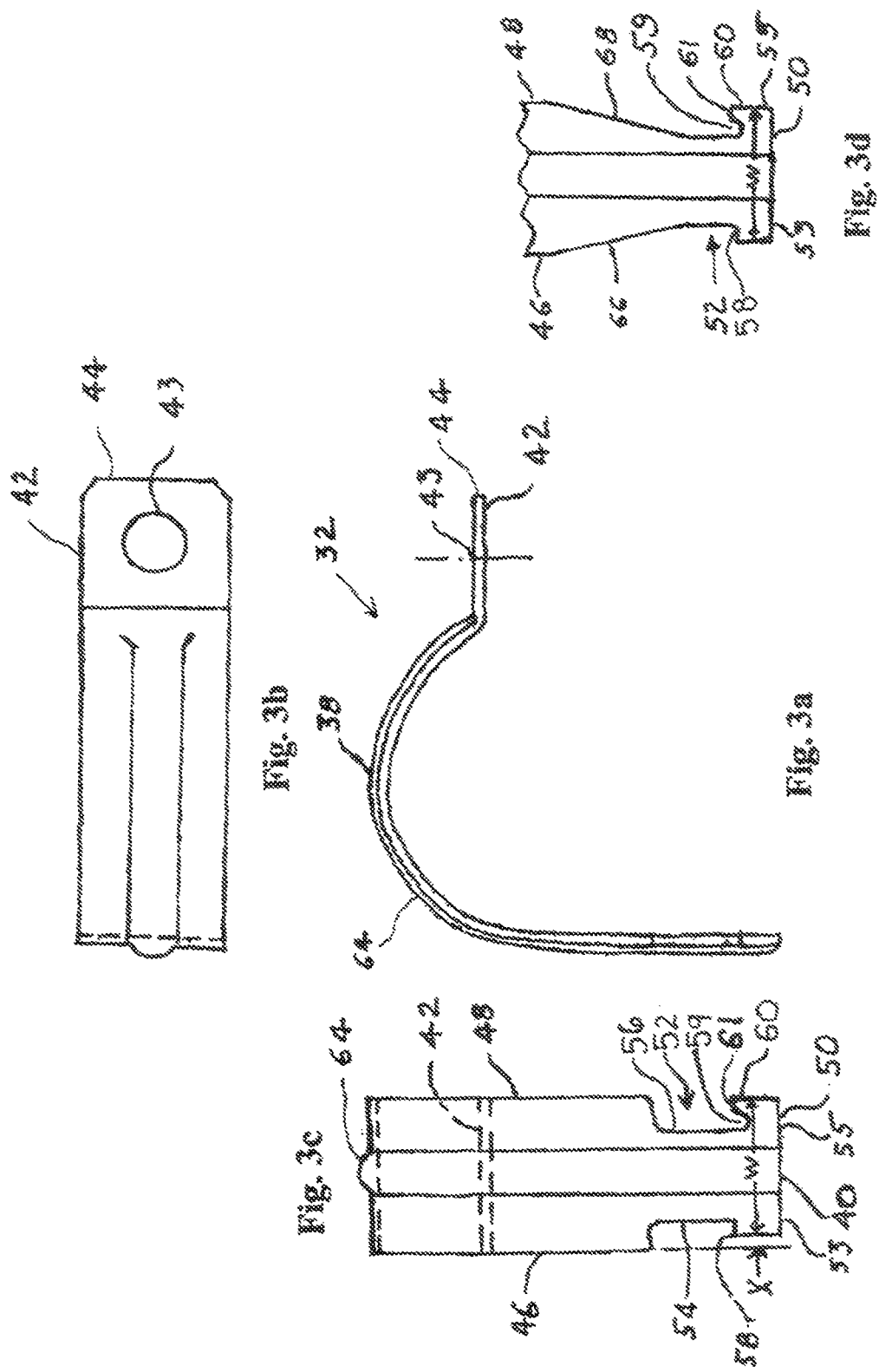

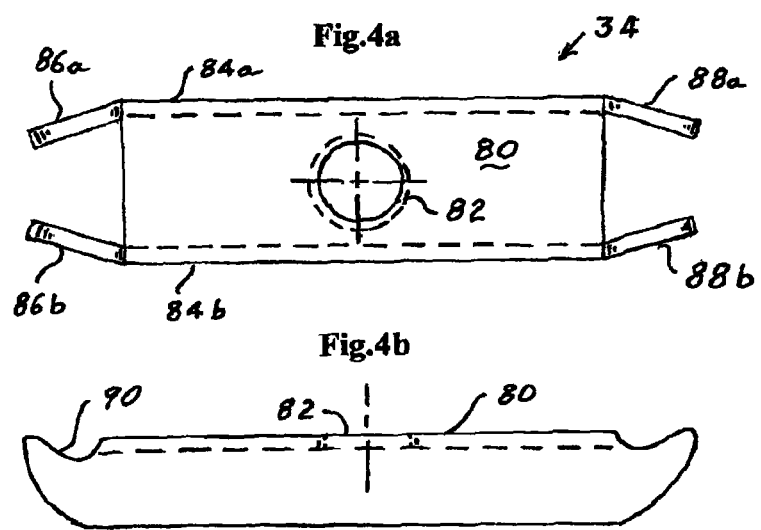

STRUT CLAMP

RELATED APPLICATIONS

This is a continuation application of application Ser. No. 13/692,953 filed on Dec. 3, 2012 which is a divisional application of application Ser. No. 12/256,407 filed on Oct. 22, 2008.

FIELD OF THE INVENTION

The invention relates to clamps that are used for clamping pipes and conduits to construction struts.

BACKGROUND

Construction struts (they are also called channels and framing channels) are well known and ubiquitous in construction, especially in commercial buildings. One of their purposes is to enable pipes and conduits to be installed by being clamped to the construction struts.

A good reference for construction struts as well as accessories for use with them can be found in the catalogue of ERICO International Corporation of Solon, Ohio, and their website ERICO.com. One of the most commonly used accessories with construction struts are clamps for clamping pipes and conduits to the construction strut. Several of these can be found in the ERICO catalogue including a design that is also described in U.S. Pat. No. 4,429,440 the content of which is incorporated by reference herein.

Another good reference to these products is Thomas&Betts Corporation of Memphis Tenn.

FIG. 1 shows in cross-section a typical construction strut (taken from the catalogue of Thomas & Betts). These are made by the various manufacturers to dimensions which are either the same or sufficiently substantially the same that accessories will fit on those made by the various manufacturers as shown on FIG. 1 but varying in height. Therefore a standard configuration of the top and inturned flanges and width is adopted by the industry which enables the use of various accessories regardless of the manufacturer of the construction strut. There are other standardized features one of which is providing slots on the bottom of the construction strut. Using the slots, some accessories can be attached to both the top and the bottom of the construction strut. A typical accessory is the clamp which is the subject of the present invention.

FIG. 2 shows three common types of pipe clamps of the prior art designated E1, E2 and E3. Pipe clamp E1 features separate sides 20a and 20b which are held in the construction strut 10. A perspective drawing of type E1 is shown in the ERICO catalogue at page 78. Type E1 is installed by fitting the separate sides 20a and 20b into the construction channel with the pipe between them, and then fastening them together with the threaded fastener and nut 22. Type E1 has the disadvantages of having four parts (including the nut), most inconveniently, the clamping sides 20a and 20b being separate. It is difficult to install when there are several pipes to be installed close to each other because a screwdriver cannot be used and they have to be manipulated to be held in position as the screw is inserted to keep them assembled. Notably, often installation of pipes and conduits has to be done in very tight and crowded spaces.

Type E2 in FIG. 2 is made to improve type E1 by allowing easier access to the fastener head but it too has disadvantages; when the fastener is tightened it tends to move to a more vertical position exposing the head and putting uneven pressure on the pipe.

Type E3 is shown in the Erico catalogue on page 80 and it is shown in U.S. Pat. No. 4,429,440. It has the disadvantage that it does not wrap around the pipe so the pipe is not firmly gripped and is subject to twisting. Also, if the fastener is tightened too much the pipe can be crushed; therefore, this type cannot be used on heavy duty work requirements.

All three of these illustrated fasteners has the additional disadvantage that there is a portion exposed allowing injuries to workers who pass under them as shown in FIG. 2 and also injury to hands and arms when trying to work in a crowded space. One of the problems in this work is that it is often done in tight and crowded spaces and with a lot of adjacent pipes and conduits.

There is a need for a clamp that is easy to install, does not expose a fastener head, allows ready access for tightening and has a clamping surface to keep it firmly in place.

Also there is often a need to clamp a pipe or conduit to the opposite bottom side of the construction strut, where there are slots; a versatile clamp that will work on both sides of the construction strut is very desirable Also, there is a need not only for such a versatile clamp, but one that in accomplishing that versatility also is easy to install.

In construction it is often the case that construction struts will be stacked. This is shown in FIG. 2b. In the figure stacked construction struts are shown. For illustrative purposes, in between struts 10 and 10a there are clamps of the type E1, E2 (as in FIG. 2a) and between struts 10 and 10b there are clamps of the type E3 (as in FIG. 2a). The problem with both of these clamp types lies in the dimension N, between the struts. The present invention recognizes the desirability of reducing that distance.

BRIEF DESCRIPTION OF THE DRAWINGS

FIGS. 3a, 3b and 3c are views of an exemplary strip member of the clamp of the invention.

FIG. 3d shows an alternative structure for the clamp neck.

FIGS. 4a and 4b are a top and side view respectively of an exemplary nut of the invention.

DETAILED DESCRIPTION

The present invention is a strut clamp that is an improvement over prior designs in several aspects. One improvement is that the fastener head is easily available for tightening, in particular, with a screw driver, and also is not exposed above the top of the pipe and does not extend horizontally. Another improvement is that the same clamp can be used on the top (open) side of a construction strut, or on the bottom (closed) slotted side (that is, it has a series of short spaced-apart slots). Another improvement is that the clamp can be inserted straight-in between the inturned flanges of a construction strut; that is without an angled or twist maneuver. Another improvement for some embodiments is that it is easy to install because the parts can be all assembled into a single unit away from the strut and then be installed together. Another improvement is that there is always a good range of wrap-around to keep the pipe from moving. Another improvement is that stacked construction struts can be closer together than with other clamps. All of these improvements and others will be seen and further explained in the following description.

The invention is used in combination with a construction strut to clamp pipes (for convenience the term "pipe(s)" will be used to include all circular members, including pipes and conduits) that are to be clamped to a construction strut. Construction strut configurations are known and are available from many sources but with the same configurations and substantially the same dimensions, for installing a clamp. It is in combination with construction struts that the present invention is advantageous.

Figure 1:
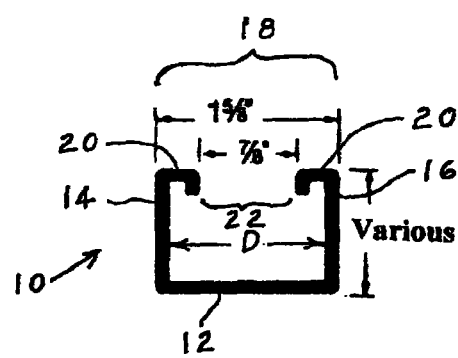
FIG. 1 is a section of a typical construction strut.

Referring first to FIG. 1 there is shown a typical construction strut exemplary of use with the clamp of the present invention in which the construction strut 10 in the form of a channel is defined by a bottom wall 12, side walls 14 and 16 and a top 18 having inturned flanges 20 extending from the side walls 14 and 16 respectively defining a space 22 between them, also called a slot or channel, extending the length of the construction strut, and an inside distance D between the side walls 14 and 16. The bottom wall 12 can have a series of spaced apart slots 24 (see FIGS. 10-13) which are available in a variety of lengths and spacing. Construction struts are sold by a number of manufacturers, and are of generally standardized dimensions in which the height of the side walls 14 and 16 may vary, but the dimensions defining the width of the strut, the top inturned flanges 20, the slot 22 and the inside distance D are sufficiently substantially similar that accessories such as the present clamp will fit on the construction struts made by a number of manufacturers. As shown in FIG. 1 the width of the space 22 is nominally ⅞ inch and the total width of the strut is nominally 1⅝ inch. The inside width D depends on the thickness (12 and 14 gauge are common) of the strut material and is not typically given in manufacturers' catalogues, however for purposes of the present description a dimension of about 1½ inch is taken as applicable. As for the slots in the bottom wall 12, a series of slots on 2 inch centers and having dimensions of 1⅛ inch long and 9/16 inch wide is common. While the present invention can be dimensioned for various dimensions of the slots, a width of 9/16 and length of 1⅛ inch is a selected preferred slot width and length for which the present invention can be configured and it is a very common slotting.

Referring to FIGS. 3a-d, 4a-b and 5, in one embodiment the clamp 30 of the present invention comprises three parts which are, a clamp strip 32, a nut 34 and a bolt or machine screw 36. These are used in conjunction with an industry standard construction strut 10 holding in place a pipe P. Pipes come in different sizes, such as from ½ inch to 5 inch. They also come in different types such as EMT and RIGID. In general, a clamp is configured for each pipe size. That is, the length of the strip 32 and its curvature are specific for a pipe size. Pipe sizes are specified for their inside diameter (ID) and the outside diameter will depend on the thickness of the pipe. Therefore the strip curvature will be specific for that outside diameter. There are some cases in which a clamp can fit more than one pipe because different pipe types allow this. For example in some prior art clamps a single clamp can be used for a ¾ inch EMT and a ½ inch RIGID pipe. Nevertheless, commonly, within the size range for a given pipe type, there is a clamp configured to fit each pipe size. In particular the length of the strip and its curvature are made to fit. However in the present invention the retaining tab and the neck portions (as described below) are configured for the dimensions of the industry standard construction strut and therefore will be the same for all sized clamps. In this description the term "engage" refers to the curvature of the strip fitting to the curvature of the pipe. The term "pipe" is intended to mean any of the circular items that the present strut clamp is used for, including pipes, conduits and other circular items.

The clamp strip 32 has an intermediate portion 38 that has a curved portion or curvature for extending around the pipe to be clamped. The strip 32 terminates at a first end 40 which will also be referred to as the gripping end; and, extending into a flat shelf portion 42, it terminates at a second end 44 which will also be referred to as the fastening end; the flat shelf portion 42 having a hole 43. The clamp strip 32 has a first longitudinal side 46 and a second longitudinal side 48 which define a width of the strip. As will be explained, an exemplary width is 1 inch. At the first end 40 is a retaining tab 50 that is attached to the intermediate portion 38 by a narrow neck 52. The neck 52 can be formed in a number of ways. As will be seen the dimensional relationship of the neck 52 and the retaining tab 50 to each other and to the dimensions of the construction strut are important to the advantageous functioning of the new clamp.

Below the neck 52, the retaining tab 50 has a width W. It extends from each side of the neck 52 to a first side 53 and a second side 55. At least one of the sides 53 and 55 has a hook 60.

In a preferred embodiment, as described below the first side 53 has an upward facing edge 58 and the second side 55 has an upward facing hook 60 having a top 61 and a recess 59 between the top 61 and the neck 52 such that the upward facing edge 58 and the top 61 of the hook 60 are aligned.

In a preferred embodiment the width W is less than the nominal ⅞ inch dimension of the opening 22 in the common construction strut 10 (see FIG. 1); sufficiently less that the retaining tab 50 can be inserted straight down (called straight-in insertion) between the inturned flanges 20 without the need for a twist or angled insertion maneuver. Typically but not necessarily, the width of the retaining tab 50 will be narrower than the width of the intermediate portion 38 such as when the width of the intermediate portion is 1 inch as mentioned above. The width W of the retaining tab is less than the width of the opening 22, preferably in the range of about 13/16 to ⅝ inch. If straight-in insertion is not desired, the width W can exceed the width of the opening 22 so long as it will fit inside the construction strut.

In general the neck portion width will be less than the width of the intermediate portion 48; preferably by a reduction in width on each side. One way for forming the neck 52 is by notches in the strip above the retaining tab 50. This is shown in FIG. 3*c*. In the first longitudinal side 46, near the first end 40 there is a first notch 54 and in the second longitudinal side 48, near the first end 40 there is a second notch 56. The bottom of the first notch 54 is defined by an upward facing edge 58 which is not hooked while the bottom of the second notch 56 is defined by an upward facing hook 60. The notches can be reversed since there is no required left-right orientation. As noted in FIG. 3*c* in this embodiment, the upward facing edge 58 is preferably aligned with the top 61 of the hook 60 the purpose for which will be explained below.

Referring to FIG. 3*d* there is shown an alternative structure for forming the neck 52. In this form the neck 52 is formed by tapers 66 and 68 along the first side 46 and the second side 48, respectively.

Figure 8:
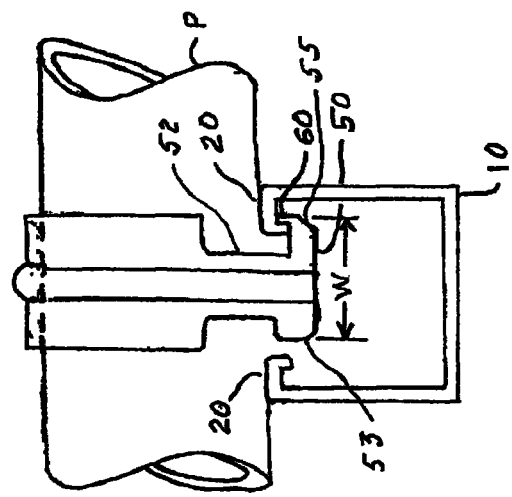
FIG. 8 is a view showing an exemplary clamp inserted and hooked under an inturned flange on the open side of a construction strut.
Figure 10:
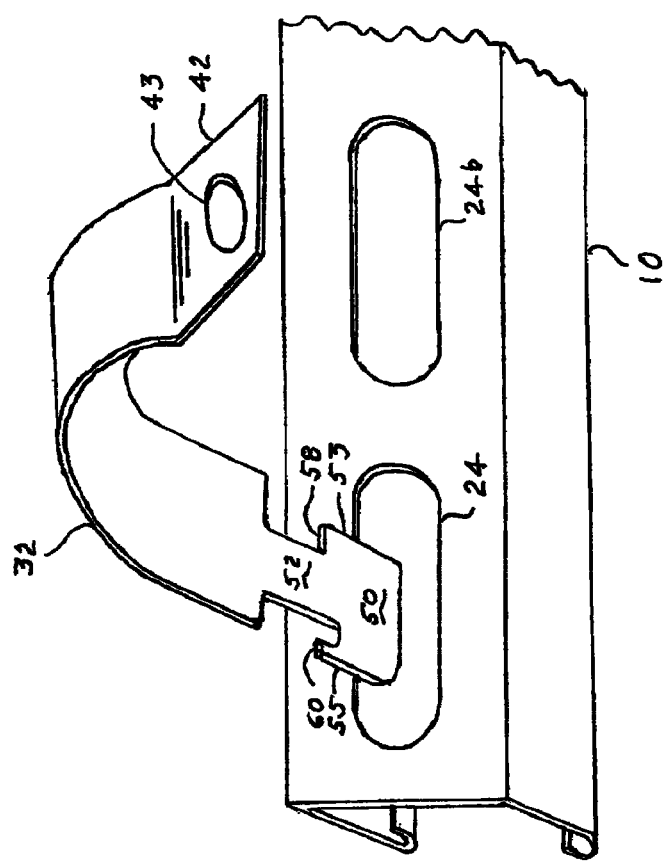
FIG. 10 shows the beginning of installation of the clamp to the bottom side of a construction strut.
Figure 11:
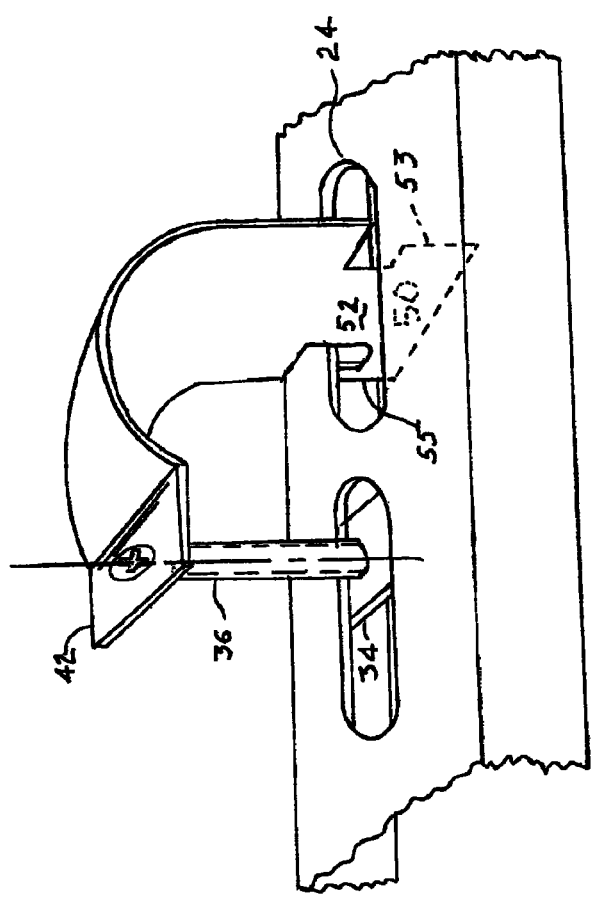
FIG. 11 shows the clamp installed on the bottom side of a construction strut.
Figure 12:
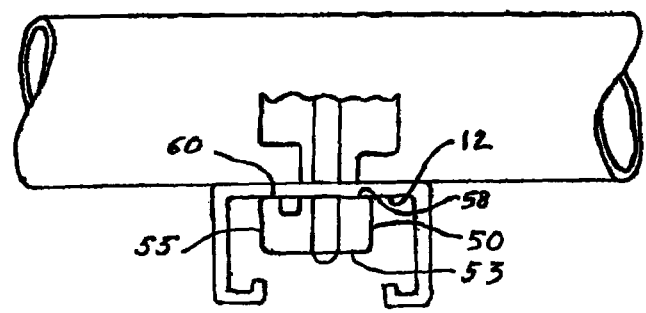
FIG. 12 is a view looking into the construction strut for the installation as shown in FIG. 11.

In the embodiment shown, the width W of the retaining tab 50 is made less than the space 22 between the inturned flanges 20 by being shorter at its first side 53 relative to the first side 46 as shown by space X while the second side 55 where the hook 60 is, is aligned with the second side 48. This alignment allows extra distance for the hook 60, on the second side 55 of the retaining tab 50. However this alignment while preferred is not essential. For example, each of the side 53 and the side 55 can be not aligned with their respective sides 46 and 48 of the intermediate portion 38. For example, the neck portion 52 and the retaining tab 50 could be located independently with respect to the width of the intermediate portion 38, extending for example from the center a selected distance to each side. Also, if the neck 52 is reduced in width added distance is available for the lateral extension of the respective sides of the retaining tab 50. This will allow more space from the neck 52 to the hook 60 which can be needed to account for variations in the dimensions of the inturned flanges 20. The essential shape and dimensions of the retaining tab 50 and the width of the neck 52 is such that the hook 60 extends sufficiently laterally away from the neck 52 that it can fit under the inturned flange (see FIGS. 6 and 8) and the edge 58 extends sufficiently laterally away from the neck 52 that it will extend beyond the edge of the slot 24 as shown in FIGS. 11 and 12; the total width of the retaining tab 50 for the embodiment for straight-in insertion, always being less than the opening 22 in the construction strut and the width of the neck 52 being less than the width of the space 22 and of the width of the slot 24 which thereby allows the hook 60 of the second side 55 to be captured under the inturned flanges 20 and both the first side 53 and the second side 55 to be captured and under the bottom 12 on each side of the slot 24.

Similar to FIG. 3*c* as explained above, in FIG. 3*d* the hook 60 is defined by having its top 61 and a recess 59 such that the top 61 is aligned with the edge 58.

The clamp strip 32 is preferably formed with a ridge 64 over most of its length in order to add stability against twisting or other unwanted bending.

FIGS. 4*a* and 4*b* show the nut 34 which is preferably formed from a plate, having a top 80 with a threaded hole 82 located centrally and sides 84*a* and 84*b* at the ends of which extend hook pairs 86*a*-86*b* and 88*a*-88*b*. The hook pairs are bent toward (convergently) each other, which makes installation easier. The convergent bending is preferably symmetrical, which allows the most convenient use. Each hook has an upward facing curved surface 90 which, as will be seen, fits under the inturned flanges 20 on a construction strut 10. Any configuration at the ends of the nut that provides spaced apart curved members to fit under the inturned flanges will broadly be within this concept. While this new nut is advantageous for the purpose of enhancing ease of installation of the clamp, nuts already known can also be used in the combination with the clamp strip 32 and the bolt or screw 36. The nut 34 is preferably smaller in width than the width of the slot 24, preferably smaller than the ⁹⁄₁₆ inch width of the common slot described above and shorter than the 1⅛ inch length of the slot, the symmetrically convergent hook pairs allowing easy passage through the slot 24. In this way, with the nut 34 threaded on the screw 36, the entire clamp can be assembled and installed in a single operation in which the nut is passed through the slot 24 or between the inturned flanges 20 and then rotated into the cross-wise position.

In use the new clamp allows for clamping a pipe to a construction strut on its top, or on its bottom. Construction struts are well known, and for purposes of the present explanation of use of the new clamp, the description above will be used. FIGS. 6-9 show how the new clamp 30 is used to fix a pipe P to the top of a construction strut 10.

Although in the figures the clamp 30 and pipe P are shown on top of the construction strut 10, as is well known, the assembly may also be in inverted position, that is, with the construction strut inverted with the pipe suspended below it.

The clamp may be applied to a pipe already in place or the clamp can be put in place loosely, and the pipe inserted under it; then the clamp is tightened. With the clamp in place the hook 60 is captured under the adjacent inturned flange 20 on the strut 10. The width of the retaining tab 50 is small enough that it readily fits in the space 22 between the inturned flanges 20 without the need for angled or twist insertion, that is, by straight-in insertion without the need for putting it in at an angel as would be the case if the width was greater than the space 22. The space 22 is conventionally nominally ⅞ inch. A width of the retaining tab 50 from about ¹⁄₁₆ inch smaller than the opening 22 works well. A range from ¹³⁄₁₆ to ⅝ inch is preferred. If straight-in insertion is not desired, the width of the retaining tab 50 can exceed the width 22 so long as it fits readily inside the construction strut.

Figure 5:
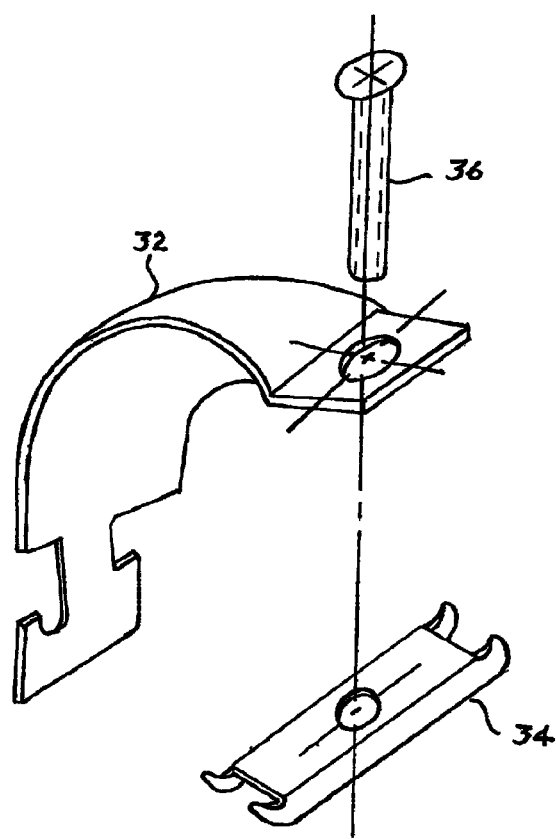
FIG. 5 is a perspective exploded view of an exemplary clamp of the invention.
Figure 6:
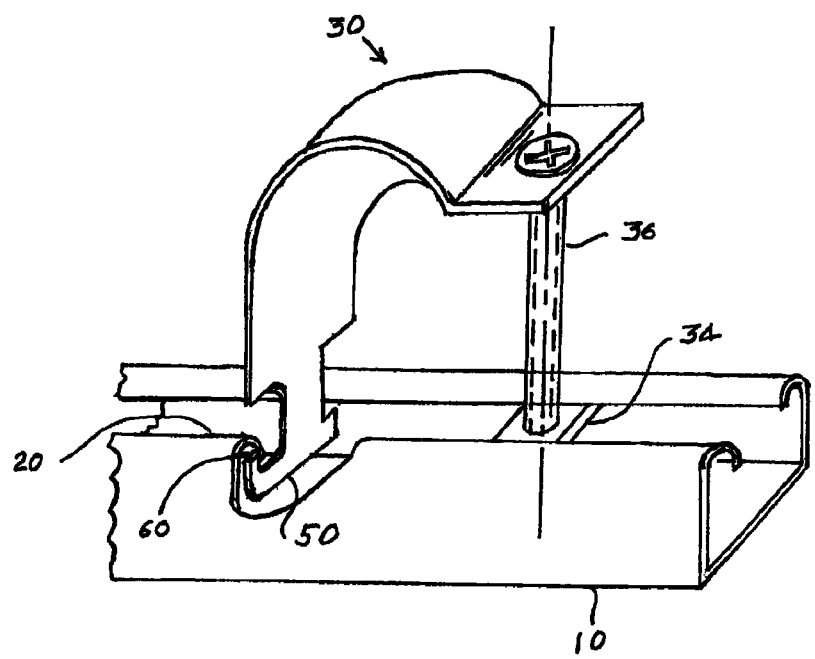
FIG. 6 is a perspective view of an exemplary clamp of the invention installed on a construction strut shown partially cut-away.
Figure 7:
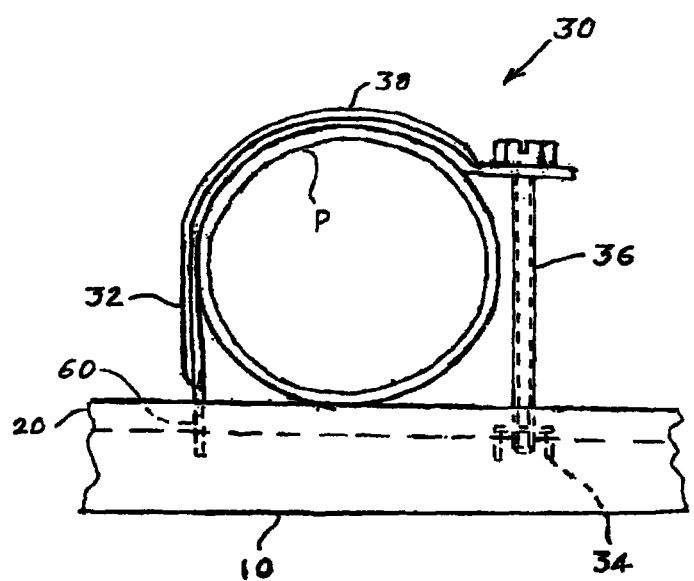
FIG. 7 is a side view of an exemplary clamp of the invention installed on a construction strut.
Figure 9:
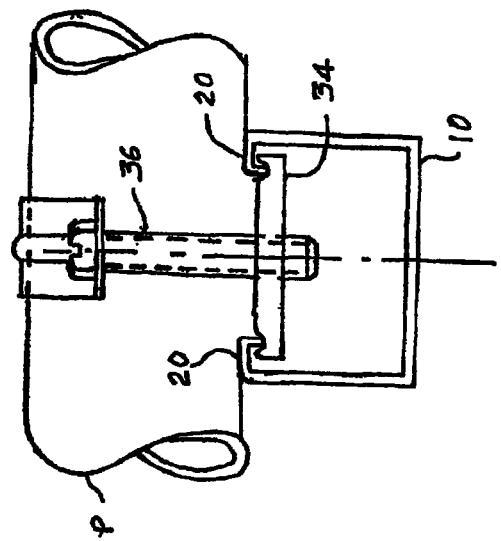
FIG. 9 is a view showing the installation and clamping of a pipe using an exemplary clamp on the open side of a construction strut.

FIG. 5 is an exploded view showing the general orientation of the clamp 32, the nut 34 and the bolt or machine screw 36 as applied to strut 10 in FIGS. 6 and 11.

Referring to FIGS. 6-9, the clamp 30 is shown installed on a strut 10. The hook 60 is captured under the inturned flange 20 while the opposite side 53 of the retaining tab is not captured by the adjacent inturned flange 20 (FIG. 8) and does not extend to interfere with the opposite inturned flange. A good way to achieve this is to make the second side 55 extend beyond the neck 52 more than does the first side 53. That allows for variation in the capture of the hook 60 under the inturned flange 20 on one side while avoiding the first side 53 hitting the other inturned flange 20 as can be appreciated by FIG. 8. Of course, in the case where the total width W of the retaining tab 50 is less than the width 22 between the inturned flanges 20, this is automatically accommodated since the first side 53 cannot interfere with the proximate inturned flange when the hook 60 is under the other inturned flange.

Figure 14:
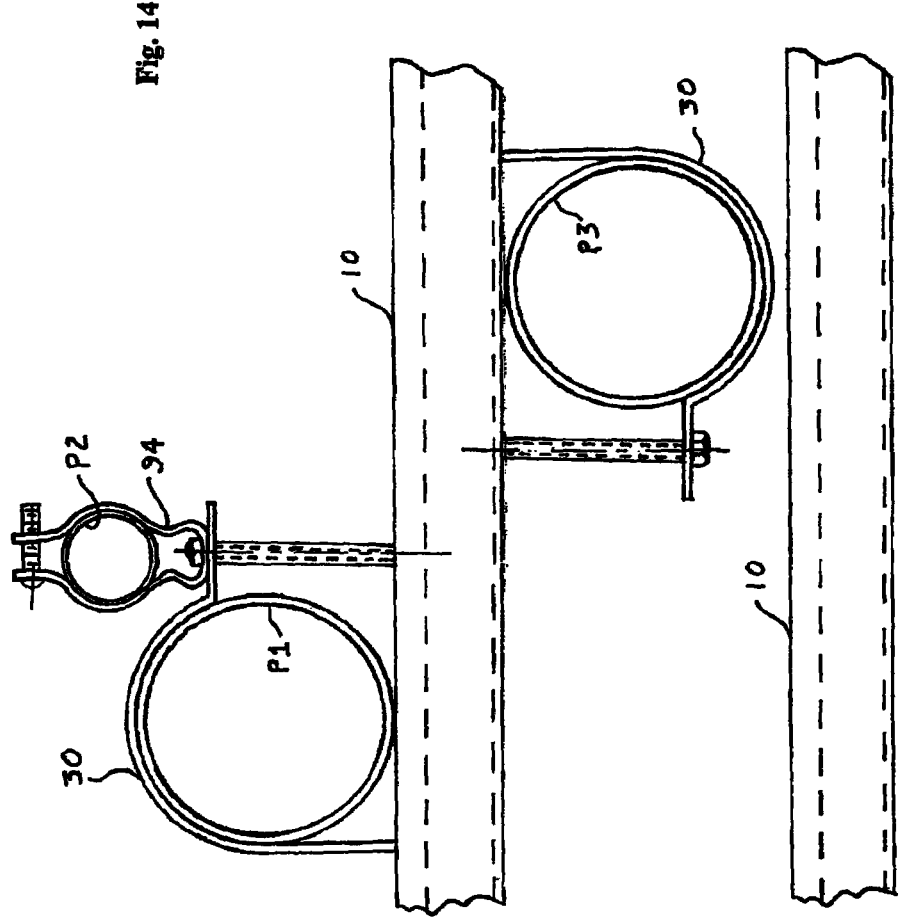
FIG. 14 is a view showing the invention as used to mount a pipe below and above a construction strut as well as mounting an additional pipe on the clamp of the first pipe and also showing a stacked construction strut.

The nut 34 is captured under the inturned flanges 20 by contact of the curved surfaces 90. The bolt 36 is tightened to the nut 34 holding the pipe P firmly in place. The head of the bolt 36 is presented upright from the strut and below the pipe P; it can be easily tightened by a screwdriver or a wrench (for hex head bolts), but it does not present a risk of injury, or the need to avoid injury because it is below the curvature 38 of the clamp 30 (see also FIGS. 14 and 15). Also, adjacent clamps do not interfere with each other. Further, as seen in FIG. 14, stacked struts can be more closely stacked. The bolt can have a hex head and a screwdriver slot, or any other type of head that is available, but preferably for tightening with a blade screwdriver or a Philips screwdriver.

Figure 13:
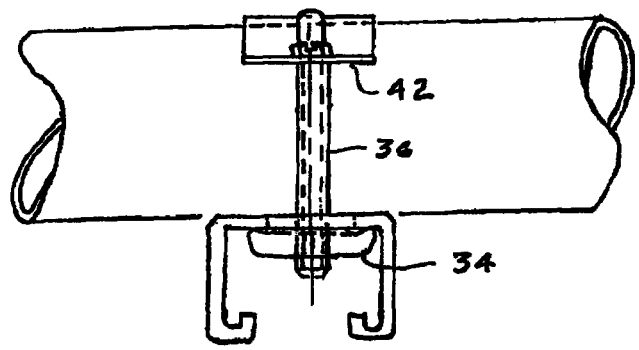
FIG. 13 is another view looking into the construction strut for the installation as shown in FIG. 11.

The clamp can also be used to clamp a pipe on the bottom 12 of the strut 10 when it is provided with slots 24, which is a common feature available on construction struts. This is shown in FIGS. 10-13. First the clamp strip 30 is inserted sideways into the slot 24 (FIG. 10) sufficiently that the retaining tab 50 is inside the strut 10 and the neck 52 is aligned with the slot 24. Then it is turned into the cross-wise or straddle position so that the retaining tab 50 will be captured under the bottom 12 with the hook 60 and the flat edge 58 extending on each side of the slot 24 in contact with the interior surface of the bottom wall 12. The flat portion 42 of the second end 44 of the strip 32 is now above another slot 24*b* along the length of the strut 10. As described above, although not shown in FIG. 10, the screw 36 and the nut 34 can be assembled to the strip 32 and the nut guided into the adjacent slot 24*b* and rotated into the cross-wise position as shown in FIGS. 11 and 13. It can be appreciated that by having one side of the strip 32 having a hook 56, there is a positive connection to the inturned flange 20 when installed in the top of the strut and by having a flat edge 54 on the opposite side, there is a clamping on both sides of the slot 24 in that configuration, the flat edge 54 providing added strength for the clamping action.

FIG. 14 shows the versatility provided by the invention. One clamp 30 is positioned on the top of a strut 10 clamping a first pipe P1 and using a bracket clamp 94 a second pipe P2 is clamped above it. Under the strut 10 another pipe P3 is clamped in place with a clamp 30 on the bottom wall 12.

Figure 2A:
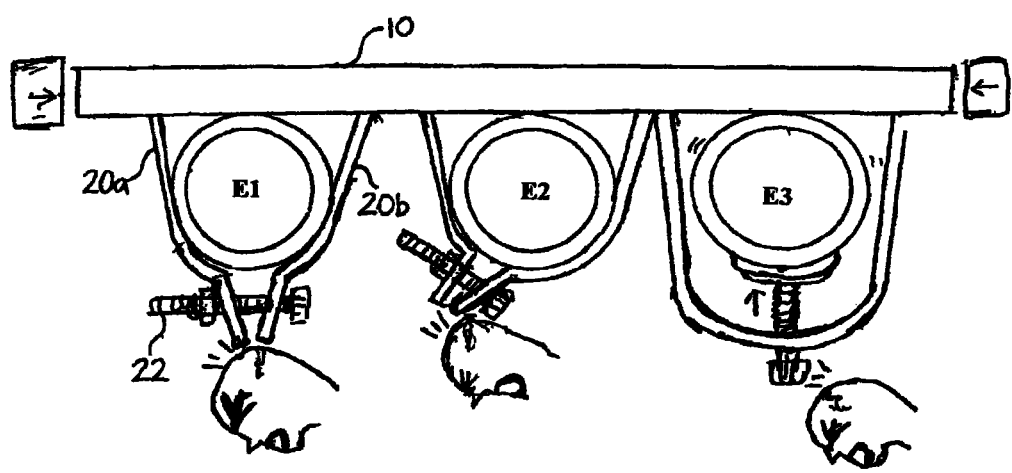
FIG. 2a shows some prior art clamps.
Figure 2B:
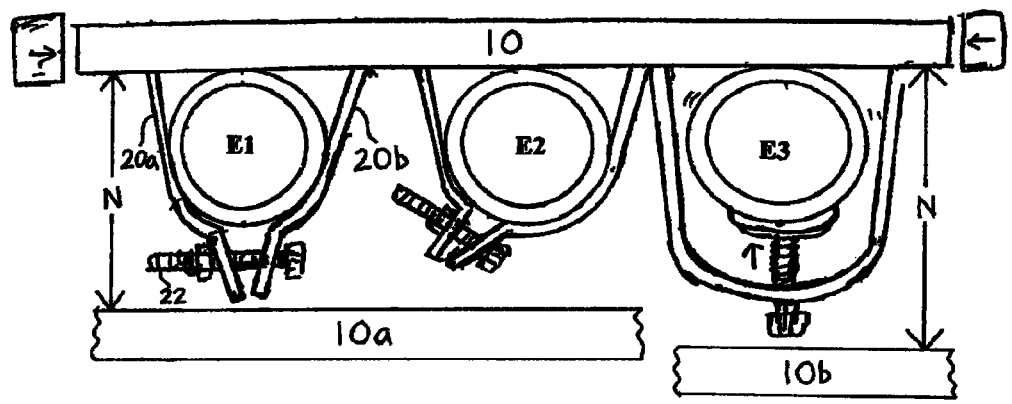
FIG. 2b shows stacked construction struts with prior art clamps

FIG. 14 also shows the advantage of the invention in reducing the distance between stacked construction struts. In this respect, comparison is made to the distance between stacked construction struts which distance is dictated by the configuration of the clamps E1, E2 and E3 in FIG. 2. However with the present clamp, the stacked construction struts shown in FIG. 14 are able to be closer together.

Figure 15:
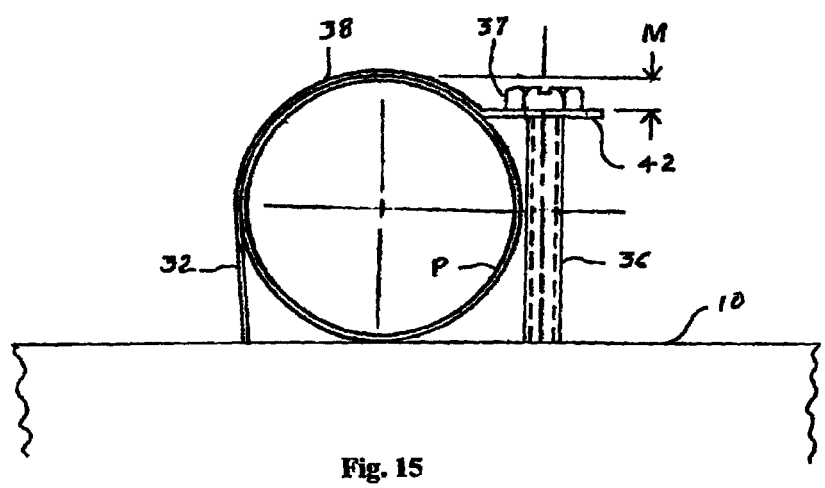
FIG. 15 is a view showing the head of the fastener below the maximum curvature of the strut clamp.

FIG. 15 illustrates the requisite configuration for the head of a fastener to be below the maximum curvature (the maximum distance from the construction strut) of the intermediate portion of the strut clamp. The dimension M from the maximum curvature of the intermediate portion 38 to the flat shelf portion 42 must be more than the height of the head 37 of the fastener 36. In most applications the fastener head height is about 5/32 in. for a hex head or about 3/16 in. for a round head. Therefore, the distance M is preferably at least about ¼ in. Also, that dimension should be less than the radius of the curvature so that it will not be lower than half way to the strut 10.

The clamp can be made in a range of sizes each size made to accommodate a pipe size. As noted above the dimensions of the construction strut are standardized, so the relationship of the parts of the clamp that interact and interengage with the construction strut can be determined in that context. The size variables for different pipes are the width, length and degree of curvature of the intermediate portion 38. The exemplary version given above has a width of 1 inch for the intermediate portion 38; wider and thinner dimensions may be applicable although a single width is preferred for all sizes. The length of the intermediate portion 38 is selected so that the head of the screw 36 can be below the upper reach of the curvature as described above.

The foregoing Detailed Description of exemplary and preferred embodiments is presented for purposes of illustration and disclosure in accordance with the requirements of the law. It is not intended to be exhaustive or to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . ."

The invention claimed is:

1. A method for clamping a pipe or conduit or similar circular item to a standard construction strut of the type having a top side with a longitudinal space defining an opening having a width dimension defined by spaced apart inturned flanges and having a bottom side having an inside surface and that has longitudinally spaced apart slots having a width dimension and a length dimension that is greater than the width dimension comprising:

providing a strut clamp comprising;

a metal strip having a first end and a second end, near the first end having a neck portion that has a width that is less than the width dimension of the longitudinal space and less than the length and width dimensions of the slots of the standard construction strut and a retaining tab below the neck portion, the retaining tab having a first and second side each extending outwardly on opposite sides of the neck portion, and the first side having an upward facing straight horizontal edge and the second side having an upward extending hook having a top and a recess between the top and the neck, the upward facing straight horizontal edge and the top of the hook being aligned perpendicular to the metal strip and the retaining tab having a width that is less than the width dimension of the longitudinal space and of the length of the slots and greater than the width of the slots of the constructions strut and the metal strip near the second end being adapted for passing a fastener through it and an intermediate portion extending between the first and second ends having a curvature portion; and the strut clamp further comprising a nut having opposite ends defining a length dimension that is long enough to span the inturned flanges and having a width dimension that is less than the opening width dimension of the longitudinal space of the to side of the construction strut and that is less than the width dimension of the slot in the bottom of the construction strut and the nut having a length dimension that is less than the length dimension of the slot whereby the nut may be inserted straight-in to the to of the construction strut or to a slot in the bottom of the construction strut and the nut further having a central portion between the ends and having a threaded hole substantially midway of the central portion adapted for engaging a fastener and when prepared for installation having the nut loosely attached to a fastener extending from the second end of the strip;

attaching one or more of the strut clamps selectively either;

(a) to the top of the construction strut by passing the retaining tab allowably by straight-in insertion through the opening whereby attaching the clamp to the construction strut can be done with the clamp aligned longitudinally of the construction strut and the hook on the second side of the retaining tab engaging an inturned flange of the construction strut either before placing a pipe or conduit or similar circular item under its curved portion or after that item is in place, placing it over the item such that the curvature engages the item and passing the nut by straight-in insertion through the opening and rotating the nut to place the nut under the inturned flanges of the construction strut;

and fixing the strut clamp in place to secure the pipe or conduit or similar circular item in place by tightening the fastener to the nut; or (b) to the bottom of the construction strut by inserting the retaining tab of the strut clamp through a selected one of the slots at an angle that allows it to pass through the slot and rotating the strut clamp allowing the upward facing straight horizontal edge of the first side of the retaining tab and the top of the hook of the second side of the retaining tab to engage the inside surface of the bottom side of the construction strut on each side respectively of the slot; passing the nut straight-in through the slot and rotating it into contact of the inside surface; and capturing a pipe or conduit or similar circular item under the curved portion of the strut clamp;

fixing the strut clamp in place to secure the pipe or conduit or similar circular item in place by tightening the fastener to the nut.

2. The method of claim 1 the nut having opposite ends each of the ends being formed as a pair of spaced apart hooks each hook having an upward facing curved element and a central portion extending from the pairs of hooks and having a threaded hole substantially midway of the central portion.

3. The method of claim 2 wherein the nut is formed as a channel in which the central portion has sides extending downwardly from a face surface and the pairs of spaced apart hooks are formed as ends of the sides extending beyond the face surface.

4. The method of claim 3 wherein each of the pairs of spaced apart hooks extend symmetrically convergently beyond the face surface.

5. The method of claim 1 wherein the second end has a bend across its width to define a flat area in which the hole is positioned and the curvature portion extends lengthwise from the bend to a straight portion that ends at the neck portion whereby the head of a selected fastener is below maximum curvature point relative to the construction strut of the curvature of the intermediate portion.

6. The method of claim 5 wherein the flat area is at least ¼ inch below the maximum curvature point of the intermediate portion so that a head of a selected fastener will not extend above the top of the curvature.

7. The method of claim 1 wherein the width of the retaining tab does not exceed about 13/16 inch.

8. The method of claim 7 wherein the second side of the retaining tab extends outwardly beyond the neck portion by not less than about 3/16 inch.

9. The method of claim 1 wherein the width of the neck portion does not exceed about ½ inch.

10. The method of claim 1 wherein the second side of the retaining tab extends beyond the neck portion more than the first side of the retaining tab.

11. A method for clamping a pipe or conduit or similar circular item to a standard construction strut of the type having a top side with a longitudinal space defining an opening having a width dimension defined by spaced apart inturned flanges and having a bottom side having an inside surface and that has longitudinally spaced apart slots the slots having a width dimension and a length dimension that is greater than the width dimension comprising:

providing a strut clamp comprising;

a metal strip having a first end and a second end, near the first end having a neck portion that has a width that is less than the width dimension of the longitudinal space and less than the length and width dimensions of the slots of the standard construction strut and a retaining tab below the neck portion, the retaining tab having a first and second side each extending outwardly on opposite sides of the neck portion, and the first side having an upward facing edge and the second side having an upward extending hook having a lower hook portion that receives a distal end of the inturned flange when attached to the to side of the construction strut and a to hook portion positioned above the lower hook portion wherein the top hook portion is coplanar with the upward facing edge such that the top hook portion and the upward facing edge contact the inside surface of the bottom of the construction strut when the clamp is attached to the bottom of the construction strut and the retaining tab having a width that is less than the width dimension of the longitudinal space and of the length of the slots and greater that the width of the slots of the construction strut and the metal strip near the second end being adapted for passing a fastener through it and an intermediate portion extending between the first and second ends having a curvature portion;

whereby one or more of the strut clamps may be attached to the construction strut at either its top or bottom respectively;

(a) to the top of the construction strut by passing the retaining tab allowably by straight-in insertion through the opening whereby attaching the clamp to the construction strut can be done with the clamp aligned longitudinally of the construction strut and the hook on the second side of the retaining tab engaging an inturned flange of the construction strut either before placing a pipe or conduit or similar circular item under its curved portion or after that item is in place, placing it over the item such that the curvature engages the item;

placing a nut under the inturned flanges of the construction strut;

fixing the strut clamp in place to secure the pipe or conduit or similar circular item in place by tightening a fastener extending from the second end of the strip to the nut; or (b) to the bottom of the construction strut by inserting the retaining tab of the strut clamp through a selected one of the slots at an angle that allows it to pass through the slot and rotating the strut clamp allowing the upward facing edge of the first side of the retaining tab and the top of the hook of the second side of the retaining tab to engage the inside surface of the bottom side of the construction strut on each side respectively of the slot;

providing a pipe or conduit having a diameter;

capturing the pipe or conduit under the intermediate portion of the strut clamp;

tightening the fastener to a nut that is inside the construction strut and accessible at a slot such that the fastener passes through the slot and engages the nut for tightening.

12. The method of claim 11 wherein the second end has a bend across its width to define a flat area in which a hole is positioned and the curvature portion extends lengthwise from the bend to a straight portion that ends at the neck portion.

13. The method of claim 11 further wherein the nut has a width dimension which is less than the opening width and a length dimension that is long enough to span the inturned flanges wherein for attaching a strut clamp to the top of the construction strut the nut is passed through the opening and turned to allow it to engage under the inturned flanges; and the nut having a length dimension that is long enough so that the nut will span across the width dimension of the slots to engage the bottom of the construction strut thereby attaching the strut clamp to the bottom of the construction strut; and tightening the fastener to the nut so as to hold in place the pipe or conduit or the like.

14. The method of claim 11 the nut having opposite ends each of the ends being formed as a pair of spaced apart hooks each hook having an upward facing curved element and a central portion extending from the pairs of hooks and having a threaded hole substantially midway of the central portion adapted for engaging the fastener.

15. The method of claim 14 wherein the nut is formed as a channel in which the central portion has sides extending downwardly from a face surface and the pairs of spaced apart hooks are formed as ends of the sides extending from the face surface.

16. The method of claim 15 wherein each of the pairs of spaced apart hooks extend symmetrically convergently beyond the face surface.

17. The method of claim 11 wherein the width of the retaining tab does not exceed about $13/16$ inch.

18. The method of claim 11 wherein the width of the neck portion does not exceed about ½ inch.

19. The method of claim 17 wherein the second side of the retaining tab extends outwardly beyond the neck portion by not less than about $3/16$ inch.

* * * * *